Patented Dec. 19, 1939

2,183,643

UNITED STATES PATENT OFFICE 2,183,643

MANUFACTURE OF CELLULOSE

Henry Dreyfus, London, England

No Drawing. Application May 5, 1937, Serial No. 140,895. In Great Britain May 5, 1936

6 Claims. (Cl. 92—9)

This invention relates to the manufacture of cellulose from lignin-containing cellulosic materials such as wood, straw, grass and the like.

According to the invention the lignin-containing cellulosic material is subjected to treatment with a mixture of an organic acid and nitric acid. Preferably this treatment is followed by a treatment with alkali.

As to the organic acid I prefer to employ a lower aliphatic acid, e. g., formic acid and especially acetic acid. The organic acid may be employed in concentrated form or in the form of an aqueous or other solution. For example aqueous acetic acid of concentration of the order of 15%, 25%, 50% or 75% may be employed, and the invention will be described with particular reference to solutions of nitric acid in aqueous acetic acid.

The aqueous acetic acid or other organic acid or solution thereof may be employed in amount at least 10 times the weight of the wood or other lignin-containing cellulosic material. Preferably the weight of the acid is of the order of 15, 20, 25 or even more times the weight of the cellulosic material.

The amount of nitric acid employed may be at least 10% of the weight of the ligno-cellulosic material, and is preferably above 15%, e. g., between 15% and 30%, and especially of the order of 15–20% or more. For example, wood may be treated with 20 times its weight of 50% or 25% aqueous acetic acid containing 1% of nitric acid, which corresponds to 20% nitric acid based on the weight of the wood; or wood may be treated with 10 times its weight of 50% or 25% acetic acid containing 1.75% nitric acid or 17.5% nitric acid based on the weight of the wood. However, other proportions of acetic and/or nitric acid may be used if desired.

The treatment with the acid may be carried out at elevated temperatures, for example temperatures up to 100° C. Temperatures of about 75°–95° C. are particularly useful, although higher or lower temperatures may also be employed with good results.

When, as is preferred, the temperature of treatment is below the boiling point of the acid liquor the reaction may be carried out under atmospheric pressure, or higher pressures may be employed. Similarly, when the temperature is such that a pressure higher than atmospheric is necessary to prevent the acid liquor from vaporising, the treatment may be carried out under the vapour pressure of the liquor or under higher pressures. Pressures higher than atmospheric or higher than the vapour pressure of the acid liquor may be produced by means of inert gases such as nitrogen or in any other suitable way. When pressures substantially exceeding atmospheric are used, the amount of nitric acid employed may be lower than when the treatment is carried out at atmospheric pressure. For example at pressures of 10, 20 or 50 atmospheres the amount of nitric acid employed may be down to 10% based on the weight of wood being treated.

The time during which the lignin-containing cellulosic material is subjected to the action of the acid liquor will depend on a number of factors such as the nature of the material being treated, the concentration of the acid, and especially on the temperature employed. For example, when working at 95° C. a period of about 1–4 hours is usually sufficient, but at lower temperatures the reactions proceed more slowly, so that at 75° C. the treatment may require up to 12 or 16 hours.

After the treatment with the acid liquor the cellulosic material may be freed therefrom as far as possible by pressing, centrifuging or in any other way and may, if desired, be washed. Thereafter it is preferably subjected to a treatment with alkali. For example, it may be treated with cold, moderately strong alkali, e. g., a caustic soda of 7–20%, and/or it may be treated with a warm or hot or boiling solution of an alkali of lower concentration, and especially of concentration of about 5% or less, for instance between 1½ and 3½%. The treatment with such dilute alkali may be relatively vigorous; for example it may be carried out at the boiling point of the alkali solution at atmospheric pressure or may be carried out at higher pressure, either at the boiling temperature or below the boil, for example at temperatures from 100°–130° C. It is particularly advantageous to employ such dilute alkali under a pressure in excess of the vapour pressure of the solution at the temperature obtaining. Such excess pressure may for example be produced by compressed nitrogen or other gas having no deleterious effect on the treatment. Thus pressures of 6–10 atmospheres in excess of the vapour pressure of the alkali solution may be employed at temperatures of 100°–130° C.

The cellulosic material resulting from the treatment with the acid liquor may with advantage be subjected to a two-fold treatment with alkali, preferably first with dilute alkali at elevated or moderately elevated temperatures and under atmospheric pressure or superatmospheric pressure, and then with cold, more concentrated alkali, for example caustic alkali of concentration between 7 and 20%.

In one form of the invention the treatment with the acid liquor may be preceded by a treatment with alkali, although it is preferable in such case also to follow the acid treatment by a treatment with alkali as already described. The first alkali treatment may, for example, be carried out by means of dilute alkali at an elevated temperature, for instance a caustic alkali of concentration of the order of 1–5% or more at a temperature in the neighbourhood of or exceeding 100° C. Advantageously this alkali treatment may be continued until a substantial proportion of the lignin contained in the materials has been removed. Whether or not a preliminary alkali treatment of this kind is employed the materials may first be subjected to a treatment which will remove resins, gums and like materials, for example a treatment with dilute alkali or with water under atmospheric or higher pressure. Moreover, if desired, part of the lignin may be removed from the materials by an acid treatment, for example by means of a sulphite liquor, before the treatment with the organic acid and nitric acid. Further, the process of the invention may be applied to the purification of pulps, e. g., sulphite, soda, or sulphate pulp, or pulps produced by means of chlorine or by means of organic solvents, which still contain residual lignin and/or pentosans.

Any one or more of the various treatments may be carried out in stages. For example the treatment with the acid liquor may be repeated before a treatment with alkali and/or one or both of the alkali treatments specified may be repeated one or more times. Moreover, between two acid treatments the material may, if desired, be washed or treated as, for example, with water or an alkaline solution at ordinary or elevated temperatures.

The treatments described above are particularly suitable for obtaining cellulose from woods of various kinds. The more resistant woods such as spruce wood may, if desired, be subjected to somewhat more vigorous conditions than those specified above, but it is advisable in most cases not to depart very far from the conditions specified so as to preserve the yield of cellulose and to prevent undue loss by degradation. When part of the lignin is removed by a preliminary alkali treatment or by any other preliminary treatment the material remaining may be subjected to less vigorous conditions during the acid treatment and/or the subsequent alkali treatment or treatments. For example, the acid or alkali concentrations may be reduced, lower temperatures may be employed and/or the treatment may be continued for a shorter time.

In a modification of the invention the nitric acid may be partly or wholly replaced by hydrogen peroxide; it is preferable in such cases to employ somewhat more vigorous treatment conditions, for instance higher temperature or longer time of treatment.

The lignin-containing material to be treated is preferably in a relatively finely divided form. For example, wood may be employed in the form of chips, preferably small chips, or even of sawdust or a mechanical wood pulp.

The cellulose prepared by the present process may be utilised for any desired purpose, for example for the manufacture of cellulose derivatives or for the manufacture of paper or other products comprising fibrous cellulose. It may be subjected to any desired treatments such as, for example, a chlorine or hypochlorite bleach or other bleaching treatment.

For the manufacture of organic esters of cellulose with the aid of organic acid anhydrides the cellulose, after the alkali treatment which follows the acid treatment, is preferably subjected to a further treatment with an acid and particularly with a lower fatty acid, e. g., formic acid or acetic acid. Such acids may be applied in small or large quantities and in liquid or vapour form. Similarly, treatments with mineral acids, for example hydrochloric acid, sulphuric acid or nitric acid, may be applied, preferably in conjunction with acetic acid or other lower fatty acid. Such treatments are preferably carried out under conditions of temperature, concentration and quantity of mineral acid which do not lead to substantial degradation of the cellulose. A treatment with a lower fatty acid, for example acetic acid, may be applied in such a way as to introduce into the cellulose the catalyst required for the subsequent acetylation or other esterification. If desired any mineral acid used during the pretreatment may be neutralised or substantially neutralised before applying the esterifying agent. For further details as to the pretreatment reference is made to French Patent No. 565,654 and United States Patents Nos. 1,831,101 and 1,911,069.

For the manufacture of good quality cellulose ethers and for the manufacture of viscose and other cellulose derivatives in which alkali is present during the conversion into the cellulose derivative, pretreatments with mineral and/or organic acids are in general unnecessary and the cellulose, if desired after bleaching, may be subjected directly to the treatment for conversion into the desired cellulose derivative. Similarly in making nitrocellulose the nitrating acid may be applied directly to the cellulose, bleached or unbleached, prepared in accordance with the present invention.

Cellulose esters and ethers made from cellulose produced as above described may be employed in the manufacture of articles such as filaments and yarns of artificial silk and films, foils, moulded articles, etc., as also in compositions such as lacquer and other coating compositions and moulding powders.

The following example illustrates without limiting the invention in any way.

*Example*

Sawdust is heated to a temperature of about 95° C with 20 times its weight of 25% aqueous acetic acid which contains 20% of nitric acid based on the weight of the sawdust. After about 3 hours the acid solution is removed by filtration from the solids, which are washed free from acid, and boiled for about an hour with a 3–4% caustic soda solution. The product is subjected to a chlorine bleach, and is then boiled with a 2% caustic soda solution and/or treated in the cold with 12% caustic soda. The cellulose so obtained is washed free from alkali and, if it is to be converted into cellulose acetate or other organic ester of cellulose, is treated with acetic acid as described in French Patent No. 565,654.

Having now described my invention, what I desire to secure by Letters Patent is:

1. In a process for obtaining cellulose from wood and other lignin-containing cellulosic materials by treating the materials at elevated temperatures with nitric acid in amount sufficient to convert all the lignin into alkali-soluble oxidation products and subsequently washing the materials with alkali to dissolve such products out of the materials, employing the nitric acid in admixture with at least 10 times the weight of the materials of an aqueous lower fatty acid of concentration between 15 and 75%.

2. In a process for obtaining cellulose from wood and other lignin-containing cellulosic materials by treating the materials at elevated temperatures with nitric acid in amount sufficient to convert all the lignin into alkali-soluble oxidation products and subsequently washing the materials with alkali to dissolve such products out of the materials, employing the nitric acid in admixture with at least 10 times the weight of the materials of aqueous acetic acid of concentration between 15 and 75%.

3. In a process for obtaining cellulose from wood and other lignin-containing cellulosic materials by treating the materials with nitric acid in amount sufficient to convert all the lignin into alkali-soluble oxidation products and subsequently washing the materials with alkali to dissolve such products out of the materials, employing the nitric acid, in amount at least 10% of the weight of the materials and at a temperature of 75°–100° C., in admixture with at least 10 times the weight of the materials of an aqueous lower fatty acid of concentration between 15 and 75%.

4. In a process for obtaining cellulose from wood and other lignin-containing cellulosic materials by treating the materials with nitric acid in amount sufficient to convert all the lignin into alkali-soluble oxidation products and subsequently washing the materials with alkali to dissolve such products out of the materials, employing the nitric acid, in amount at least 10% of the weight of the materials and at a temperature of 75°–100° C., in admixture with at least 10 times the weight of the materials of aqueous acetic acid of concentration between 15 and 75%.

5. In a process for obtaining cellulose from wood and other lignin-containing cellulosic materials by treating the materials with nitric acid in amount sufficient to convert all the lignin into alkali-soluble oxidation products and subsequently washing the materials with alkali to dissolve such products out of the materials, employing the nitric acid, in amount between 15% and 30% of the weight of the materials and at a temperature of 75°–100° C., in admixture with 15–25 times the weight of the materials of aqueous acetic acid of concentration between 15 and 75%.

6. In a process for obtaining cellulose from wood and other lignin-containing cellulosic materials by treating the materials with nitric acid in amount sufficient to convert all the lignin into alkali-soluble oxidation products and subsequently washing the materials with alkali to dissolve such products out of the materials, employing the nitric acid, in amount between 15% and 30% of the weight of the materials and at a temperature of 75°–100° C., in admixture with 15–25 times the weight of the materials of 25–75% aqueous acetic acid of concentration between 15 and 75%.

HENRY DREYFUS.